(12) United States Patent
Sadlier et al.

(10) Patent No.: US 12,091,957 B2
(45) Date of Patent: Sep. 17, 2024

(54) DYNAMIC MULTI-WELL OPERATION INTEGRATION IN WELLBORE DRILLING

(71) Applicant: Halliburton Energy Services, Inc., Houston, TX (US)

(72) Inventors: Andreas Gerhard Sadlier, The Woodlands, TX (US); Daniel Antonio, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 318 days.

(21) Appl. No.: 17/367,978

(22) Filed: Jul. 6, 2021

(65) Prior Publication Data

US 2022/0145746 A1   May 12, 2022

Related U.S. Application Data

(60) Provisional application No. 63/110,440, filed on Nov. 6, 2020.

(51) Int. Cl.
| | |
|---|---|
| *E21B 44/00* | (2006.01) |
| *E21B 47/00* | (2012.01) |
| *G05B 19/4155* | (2006.01) |
| *E21B 49/00* | (2006.01) |

(52) U.S. Cl.
CPC .............. *E21B 44/00* (2013.01); *E21B 47/00* (2013.01); *G05B 19/4155* (2013.01); *E21B 49/00* (2013.01); *G05B 2219/45208* (2013.01)

(58) Field of Classification Search
CPC ...... G06N 20/00; G01V 99/005; E21B 44/00; E21B 41/00; E21B 47/00; E21B 49/005; E21B 2200/22; E21B 2200/20; G05B 19/4155; G05B 2219/45208
See application file for complete search history.

(56) References Cited

U.S. PATENT DOCUMENTS

| | | | |
|---|---|---|---|
| 9,022,140 | B2 | 5/2015 | Marx et al. |
| 9,598,947 | B2 | 3/2017 | Wang et al. |
| 10,209,400 | B2 * | 2/2019 | Bermudez Martinez ................... G01V 99/00 |
| 10,233,728 | B2 | 3/2019 | Kristjansson et al. |
| 11,091,989 | B1 * | 8/2021 | De Oliveira .......... E21B 49/005 |

(Continued)

FOREIGN PATENT DOCUMENTS

| | | | | |
|---|---|---|---|---|
| WO | 2020028302 | | 2/2020 | |
| WO | WO-2021183165 A1 * | 9/2021 | ........... E21B 21/003 |

(Continued)

*Primary Examiner* — Daniel P Stephenson
(74) *Attorney, Agent, or Firm* — Kilpatrick Townsend & Stockton LLP (57) ABSTRACT

Real-time data from one or more sensors can be received about one or more active wellbore operations. A blended data set can be generated that includes the real-time data combined with historical data about previously completed wellbore drilling operations, and associated with performance attributes. Additionally, identification of a criteria of focus, types of parameters for optimization, and operation groupings for the blended data set can be received. Further, the criteria of focus, types of parameters for optimization and operation groupings for the data can be applied to the blended data set to determine an adjustment for an active wellbore drilling operation of interest. The adjustment for the active wellbore drilling operation of interest can be outputted.

20 Claims, 5 Drawing Sheets

(56) References Cited

U.S. PATENT DOCUMENTS

| | | | | |
|---|---|---|---|---|
| 2014/0116776 A1* | 5/2014 | Marx | ................ | E21B 12/02 |
| | | | | 706/11 |
| 2015/0227841 A1* | 8/2015 | Laing | ................ | E21B 49/003 |
| | | | | 706/46 |
| 2018/0187498 A1* | 7/2018 | Sanchez Soto | ......... | E21B 21/08 |
| 2020/0173269 A1* | 6/2020 | Madasu | ................ | E21B 7/04 |
| 2021/0131257 A1* | 5/2021 | Crkvenjakov | ...... | E21B 47/0025 |

FOREIGN PATENT DOCUMENTS

| | | | |
|---|---|---|---|
| WO | WO-2022155676 A1 | * | 7/2022 |
| WO | WO-2023028617 A1 | * | 3/2023 |

* cited by examiner

DYNAMIC MULTI-WELL OPERATION INTEGRATION IN WELLBORE DRILLING

CROSS REFERENCE TO RELATED APPLICATION

This claims priority to U.S. Provisional Application Ser. No. 63/110,440, titled "Dynamic Multi-Well Operation Integration in Wellbore Drilling" and filed Nov. 6, 2020, the entirety of which is incorporated herein by reference.

TECHNICAL FIELD

The present disclosure relates generally to wellbore drilling operations and, more particularly (although not necessarily exclusively), to using software to control a wellbore operation.

BACKGROUND

Wellbore tools can measure drilling data pertaining to the raw metrics associated with a drilling operation. Examples of wellbore tools can include sensors, drill bits, measurement-while-drilling subsystems, logging-while-drilling subsystems, etc. Wellbore tools) can provide different types of data or tool settings related to the use of the tool. Examples of different types of data can include time-series data, depth series data, etc. Examples of tool settings or data on use of the tool can include a rate of penetration (ROP) or rotations per minute (RPM). The raw data can indicate a variety of wellbore parameters that affect drilling results, performance metrics, and repeatability of a wellbore operation.

DETAILED DESCRIPTION

Certain aspects and examples of the present disclosure relate to dynamically integrating real-time data about a drilling operation with historical data about drilling operations, and using the integrated data in connection with controlling a current drilling operation. The real-time data can be data received from one or more sensors about the current drilling operation, and while the current drilling operation is being performed. The historical data can be data about previously completed wells. Dynamically integrating the data can include combining available historical data from one or more data sources about multiple wells with real-time data from the active drilling operations. Dynamically integrating the data can also include combining incoming real-time data with the previously combined data over the duration of an active drilling operation. Controlling the current drilling operation can include making drilling decisions or automatically outputting a command to adjust the drilling operation.

Well operations can produce data from multiple sources, including real-time data sources and historical data sources that have historical data about previously drilled wells and previous well operations. Combining datasets from different sources can improve the insight available in future well operations and can provide valuable operational performance data. But, integrating both historical data and real-time data during well operations is challenging for benchmarking performance across multi-rig operations. Doing so manually involves non-productive time to find, import, and transform the data before the data can be used. Also, the data is often static and based on specific offset wells chosen during the well planning process, rather than a dynamic dataset against which dynamic real-time data can be compared. And, adding or removing wells from the analysis set involves a time-consuming, manual process.

Some examples relate to a system for performing multi-well performance analysis that continuously combines real-time and historical datasets for comparative analysis. The system can automatically compute key performance measures that have been pre-defined. Self-service analytics allow any user to create customized, interactive visuals and make dynamic adjustments to the data for comparisons on the fly, using real-time well data and historical well data that is accessible. For example, the system can provide the ability to dynamically compare historical and real-time data together and allow each end user to make customized selections on which datasets are automatically reprocessed, using a self-service insight tool for oil and gas drilling applications. In multi-rig operations, this can reduce risk and make the projects more repeatable sooner to improve efficiency.

In some examples, real-time and historical well databases collect and store surface and downhole data for current and prior operations, respectively. From both databases, an automatic pipeline can convert the incoming multi-source data to a common format. Two separate channels can couple to the historical data sources and to the real-time data sources. A parallel process can combine the data into organized structures. Specific attributes can be continuously calculated and updated on the blended datasets. A self-service insight tool can provide access for multi-well integrated analysis. The end users may, on their own, select which wells and which attributes to compare nearly instantly. The analysis can be dynamic. For example, new data can be received continuously from the real-time streams of concurrent wells. And, in some examples, dynamic user selections can be applied to the blended data set to automatically form optimized results for the blended data set. For example, each user can select from geographies, wells, rigs, crews, activities, geologic formations, or other attributes of interest. The insight tool can display the results nearly instantly through user-defined visuals tailored for their specific needs. Doing so can avoid waiting on data to be re-imported, recombined, or values of interest to be calculated.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

Figure 1:
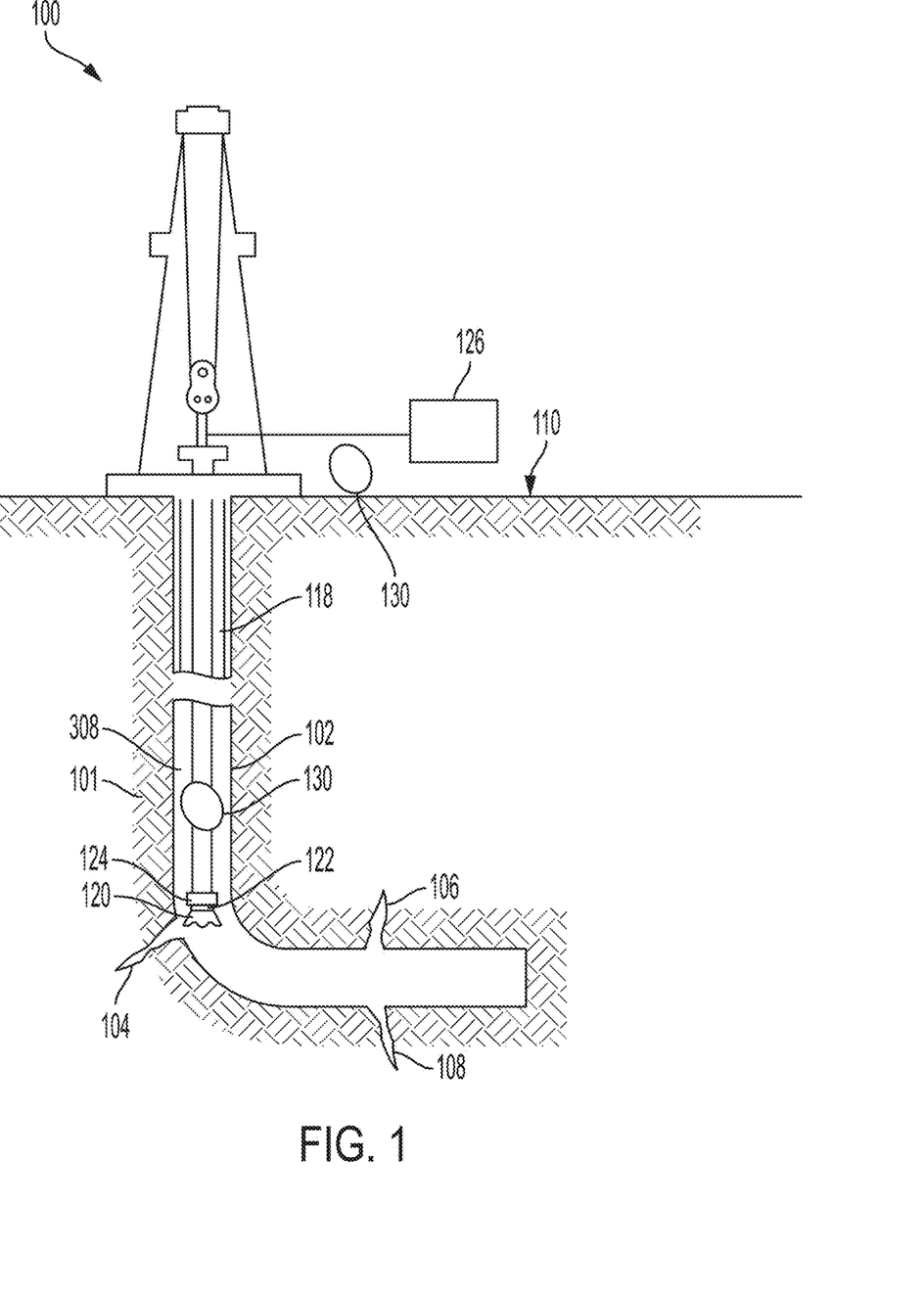
FIG. 1 is a schematic diagram of a drilling rig and a system for integrating data from multiple sources according to one example of the present disclosure.

FIG. 1 is a schematic diagram of a drilling rig 100 for drilling a wellbore 102 into a subterranean formation 101 with fractures according to one example of the present disclosure.

In this example, drilling rig 100 is depicted for a well, such as an oil or gas well, for extracting fluids from a subterranean formation 101. The drilling rig 100 may be used to create a wellbore 102 from a surface 110 of the subterranean formation 101. The drilling rig 100 includes a well tool or downhole tool 118, and a drill bit 120. The downhole tool 118 can be any tool used to gather information about the wellbore. For example, the downhole tool 118 can be a tool delivered downhole by wireline, often referred to as wireline formation testing ("WFT"). Alternatively, the downhole tool 118 can be a tool for either measuring-while-drilling or logging-while-drilling. The downhole tool 118 can include a sensor component 122 for determining information about the wellbore 102. Examples of information can include rate of penetration, weight on bit, standpipe pressure, depth, mud flow in, rotations per minute, torque, equivalent circulation density, or other parameters. The downhole tool 118 can also include a transmitter 124 for transmitting data from the sensor component 122 to the surface 110. The downhole tool 118 can further include a drill bit 120 for drilling the wellbore 102.

The wellbore 102 is shown as being drilled from the surface 110 and through the subterranean formation 101. As the wellbore 102 is drilled, drilling fluid can be pumped through the drill bit 120 and into the wellbore 102 to enhance drilling operations. As the drilling fluid enters into the wellbore, the drilling fluid circulates back toward the surface 110 through a wellbore annulus 308—the area between the drill bit 120 and the wellbore 102. A fracture, such as fractures 104, 106, or 108, in the subterranean formation 101 may cause a loss of drilling fluid leading to a loss of circulation of the drilling fluid. The fractures 104, 106, or 108 may be of natural origin or may be created during drilling operations. For example, fractures in the wellbore may be induced by increasing the pressure of the drilling fluid until the surrounding formation fails in tension and a fracture is induced. Although the wellbore operations are described with respect to drilling operations, various aspects and examples can be used in connection with other types of wellbore operations, such as completion operations or production operations.

Sensors 130 can be located at the surface of the drilling rig 100 or downhole within the wellbore 102. The sensors 130 can be scattered at multiple locations around the wellbore 102. Similar sensors to sensors 130 can be located at multiple other active wells. The sensors 130 can acquire data about the current drilling operation at the multiple wells and can measure data concurrently with the drilling operation. The sensors 130 can measure real-time data in time intervals (e.g. every one second, every five seconds, 1000 times per second) in real-time during an active drilling operation. Examples of types of real-time data can include temperature, pressure, formation evaluation, vibrations, operation data, rig data, or surface data logging. The real-time data measured by the sensors 130 can be raw data. The sensors 130 can be communicatively coupled to a computing device 126 and one or more real-time databases that include data about the actively drilled wells. The sensors 130 can transmit the real-time well data to the computing device 126 or send the real-time data remotely to the real-time databases. The real-time databases may be located at the well site or remote from the well site.

Also included in the schematic diagram is the computing device 126. The computing device 126 can be communicatively coupled to the downhole tool 118 and sensors 130 and receive real time information about the drilling process. The computing device 126 can include or be communicatively coupled to historical data sources with data about previously drilled wells. The computing device 126 may also be communicatively coupled to other computing devices associated with other wellbore drilling operations occurring at the same time as the present drilling operation. The computing device 126 can integrate data from the multiple sources and provide insight into the data to allow the current drilling operation to be controlled based on the insights.

Figure 2:
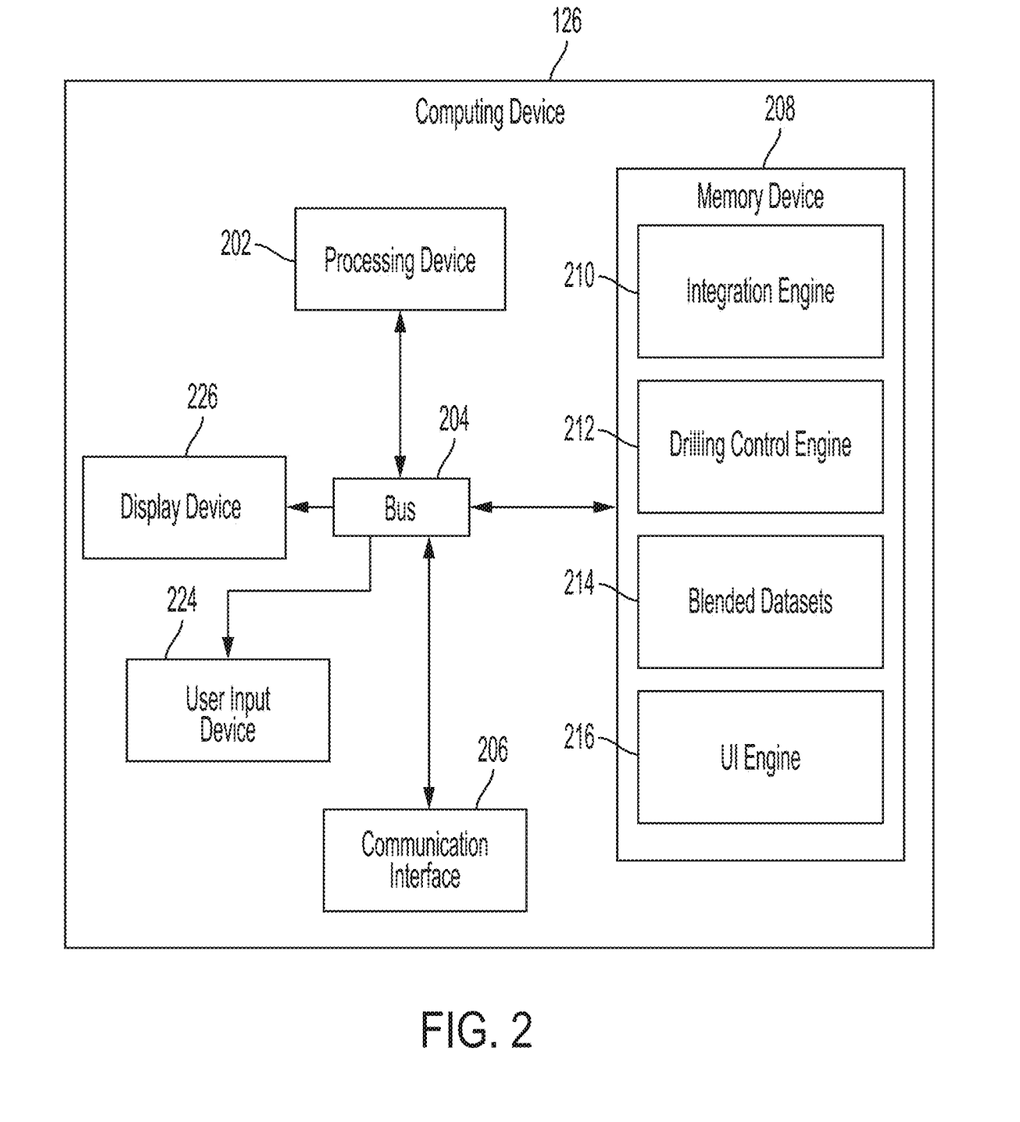
FIG. 2 is a block diagram of a computing device used for integrating data from multiple sources to determine an adjustment of a drilling operation, according to one example of the present disclosure.

FIG. 2 is a block diagram of the computing device 126 for integrating data from multiple sources to be used to control a drilling operation, according to some aspects of the present disclosure.

The computing device 126 can include a processing device 202, a bus 204, a communication interface 206, a memory device 208, a user input device 224, and a display device 226. In some examples, the components shown in FIG. 2 can be integrated into a single structure. For example, the components can be within a single housing with a single processing device. In other examples, the components shown in FIG. 2 can be distributed (e.g., in separate housings) and in electrical communication with each other using various processors. It is also possible for the components to be distributed in a cloud computing system or grid computing system.

The processing device 202 can execute one or more operations for receiving information about a current wellbore drilling operation and integrating the data with historical data to allow the wellbore drilling operation to be controlled. The processing device 202 can execute instructions 218 stored in the memory device 208 to perform the operations. The processing device 202 can include one processing device or multiple processing devices. Non-limiting examples of the processing device 202 include a field-programmable gate array ("FPGA"), an application-specific integrated circuit ("ASIC"), a processor, a microprocessor, etc.

The processing device 202 is communicatively coupled to the memory device 208 via the bus 204. The non-volatile memory device 208 may include any type of memory device that retains stored information when powered off. Non-limiting examples of the memory device 208 include electrically erasable and programmable read-only memory ("EEPROM"), flash memory, or any other type of non-volatile memory. In some examples, at least some of the memory device 208 can include a non-transitory medium from which the processing device 202 can read instructions. A computer-readable medium can include electronic, optical, magnetic, or other storage devices capable of providing the processing device 202 with computer-readable instructions or other program code. Non-limiting examples of a computer-readable medium include (but are not limited to) magnetic disk(s), memory chip(s), read-only memory (ROM), random-access memory ("RAM"), an ASIC, a configured processing device, optical storage, or any other medium from which a computer processing device can read instructions. The instructions can include processing device-specific instructions generated by a compiler or an interpreter from code written in any suitable computer-programming language, including, for example, C, C++, C#, etc.

The communication interface 206 can represent one or more components that facilitate a network connection or otherwise facilitate communication between electronic devices. Examples include, but are not limited to, wired interfaces such as Ethernet, USB, IEEE 1394, or wireless interfaces such as IEEE 802.11, Bluetooth, near-field communication (NFC) interfaces, RFID interfaces, or radio interfaces for accessing cellular telephone networks (e.g., transceiver/antenna for accessing a CDMA, GSM, UMTS, or other mobile communications network). In some examples, the computing device 112 includes a user input device 224. The user input device 224 can represent one or more components used to input data. Examples of the user input device 224 can include a keyboard, mouse, touchpad, button, or touch-screen display, etc. In some examples, the computing device 112 includes a display device 226. The display device 226 can represent one or more components used to output data. Examples of the display device 226 can include a liquid-crystal display (LCD), a computer monitor, a touch-screen display, etc. In some examples, the user input device 224 and the display device 226 can be a single device, such as a touch-screen display.

In some examples, the memory device 208 can include instructions and data, such as an integration engine 210, a drilling control engine 212, blended datasets 214, and a user interface (UI) engine 216. The integration engine 210 can be computer program code instructions that are executable by the processing device 202 for receiving real-time data, receiving historical data, normalizing each of the real-time data and the historical data, and forming the blended datasets 214. The drilling control engine 212 can be computer program code instructions that are executable by the processing device 202 for using the blended datasets 214 to control a current wellbore drilling operation. The UI engine 216 can be computer program code instructions that are executable by the processing device 202 for receiving user selection and outputting insights using the blended datasets 214.

Figure 3:
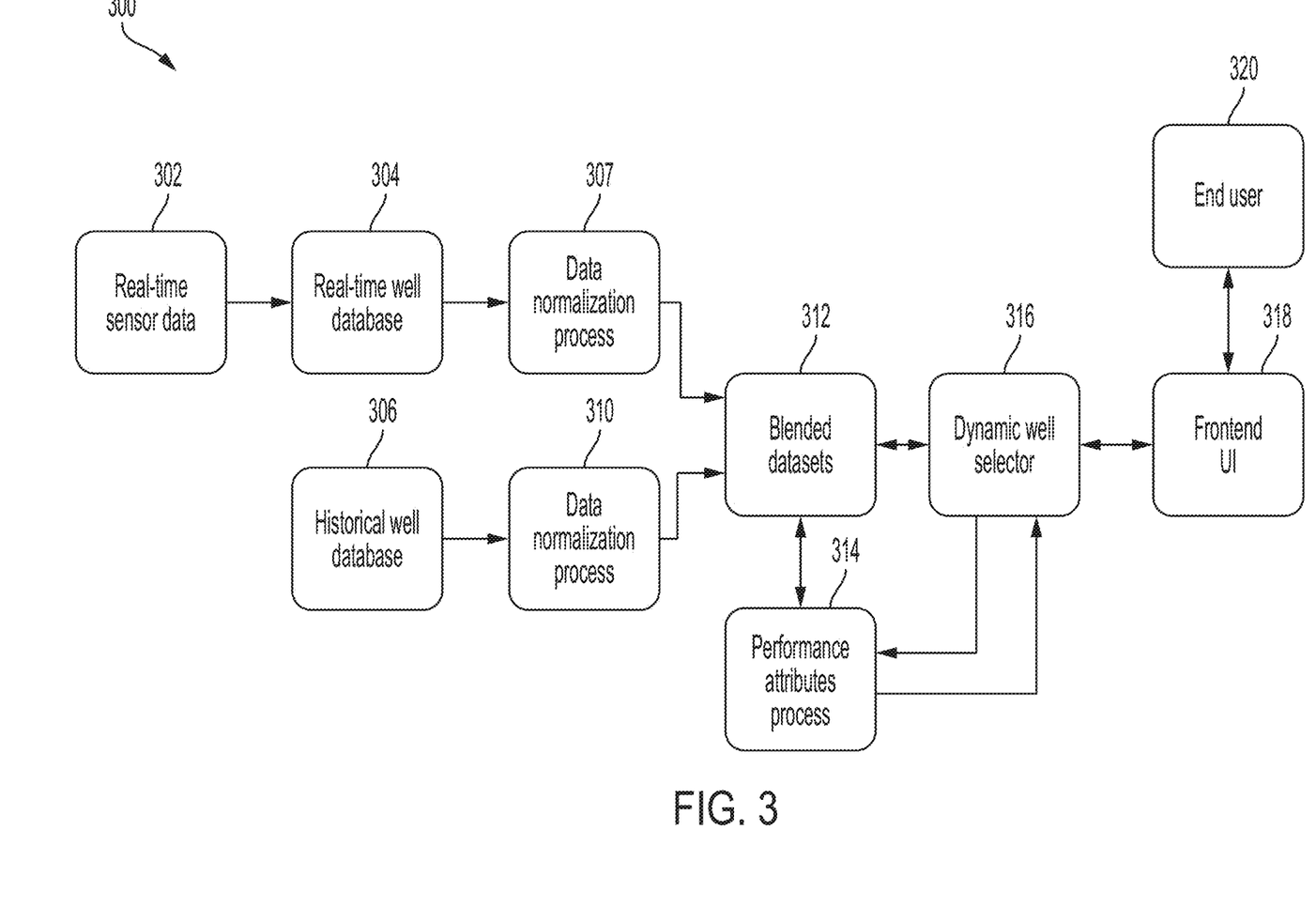
FIG. 3 is a process flow diagram for integrating real-time data and historical data to determine an adjustment of a wellbore drilling operation, according to one example of the present disclosure.

FIG. 3 is a process flow diagram for integrating real-time data and historical data to determine an adjustment of a wellbore drilling operation, according to one example of the present disclosure.

In block 302, real-time data from sensors is received by the computing device. The data can be transmitted from one or more sensors at multiple wells in a current drilling operation, including a wellbore to be controlled. In some examples, a wellbore drilling operation to be controlled can be different than drilling operations occurring at the other active wellbores. Sensor data from the sensors can indicate information about the sensor ID from which the real-time data is transmitted for distinguishing well source data. The data can include data about the subsurface formation or engineering data.

In block 304, the data from the wellbore drilling operation to be controlled and other active wellbore drilling operations is stored in a real-time well database. The real-time database can have access to multiple wells. In some examples, the wells can be nearby active wells that are part of the drilling rig. Real-time data collected from multiple active wellbore operations can be sent from the respective sensors at each active well site to a single instance of a real-time well database while the drilling occurs. Incoming real-time data from a single wellbore to be controlled can be integrated into the real-time database with the real-time data from recently active wells. In some examples, the real-time data can be integrated into the real-time database through parallel processing.

In block 306, data from completed wells—e.g., wellbores that have previously been drilled—is stored in a historical well database. In some examples, the historical well database can be a historical well data source external to the database of the computing system. For example, the historical well data source can be an online or open source repository.

In block 307, the system can format the real-time data from the real-time format for use in analyzing the data with historical data. Real-time data can be acquired and represented in a record-oriented format corresponding to the time that the observation is made. The system can transform the data into a columnar format in that each represents a measurement in a time-series. As a result, normalization may occur by computing an average or a linear regression over a window of relevant values. For example, aggregated queries can be optimized to process the data points from the series of interest with minimized latency for accessing data since other data points may not be processed. Independent time variables can be converted and normalized against the start of each activity or sub activity. Multiple curves from different activities that may have occurred at different absolute times can then be compared directly. Formatting time-series data or other log data is not limited to these methods and any other suitable technique may be used for formatting indices for the real-time data from multiple wells. In some examples, a window size of relevant values may be determined by analyzing the statistical confidence of a given variable. For example, a drilling speed variable may be analyzed for confidence based on varying sample rates (e.g. a measurement taken with a faster drilling speed, or sample rate, may result in fewer measurements per foot compared to a slower drilling speed). The data can be continuously formatted in that as each new real-time data observation is received and stored, the system can format and append it into a form usable with historical data. Further, the normalization process can occur asynchronously. For example, the normalization process can be performed on historical data only and then the same format can be applied to incoming real-time data.

In some examples, the normalization process may include building custom data categories. For example, the normalization may include adding sensor values from the sensors at the drilling rig or deriving a new data categorization from the existing data columns.

In block 310, the system can format the data from the historical database for use in analyzing the data with the formatted real-time data. Historical data can be processed in a similar manner as the real time data, except the historical data can be processed for an entire activity at the same time. Then columns can be compared across historical datasets, and compared with one or more real-time datasets collected from ongoing activities.

In block 312, the system forms blended datasets from the formatted real-time data and the formatted historical data. For example, the system can combine the different datasets and prepare the datasets to be analyzed together as a blended dataset. Time-normalized columns from different data sets can be appended into a single column in memory, creating a composite column that can be used in aggregations such as finding minimums, maximums, average, etc. The columns can also retain respective attributes so that certain portions of the columns can be filtered out to allow the user to analyze the data in a customized manner.

In block 314, the system can determine a set of predefined performance attributes continuously on the blended dataset. Users can define calculated columns or a set of summarization measures in which the calculated results dynamically change in response to the users' interaction with the data using a frontend user interface (UI). Some examples of predefined measures include rate of penetration (ROP), on bottom time, and days vs. depth curve or frequency counts of an RPM or WOB range. Frequency counts for specific text, such as "pack off," can be used to identify potential areas of negative issues.

In block 316, the blended dataset with performance attributes can be dynamically selected for analyzing the current wellbore drilling operation performance. The dynamically selected data from the blended dataset can include well data from the available actively drilled and historically drilled wells. The blended data set, performance attributes, and other well criteria can be available for user interaction via the frontend UI. In response to dynamic user selections, the data results of the blended data set may be dynamically reprocessed to form an optimized blended data set.

In some examples, the system can receive a dynamic selection of certain pre-defined performance attributes that can then be automatically computed with the optimized blended data set. In some examples, the system may receive a dynamic selection of a subset of the real-time data and the historical data that can be automatically reprocessed in reprocessing the optimized blended data set.

The system may also receive dynamic selections of a criteria of focus, parameters for optimization, and operation groupings. The criteria of focus can be selectable attributes of the well. Examples of a criteria of focus can include source, customer, formation type, geographies, wells, rigs, crews, activities, other attributes of interest, or any other suitable attributes of a wellbore drilling operation or the subsurface formation. The parameters for optimization can be selectable parameters that are the result of analyzing a wellbore operation. Examples of parameters for optimization can include duration, ROP, or any other suitable performance metrics for optimizing a wellbore operation. The operation groupings can be indications of sections of a wellbore for drilling. For example, a wellbore may be split into a certain number of sections for a drilling operation. Operation groupings applied to the blended data set may delineate different well sections, and, subsequently, may result in different modifications to the wellbore operation depending on the section of the wellbore. In some examples, an operation grouping may be indicated as a split on the blended data. The criteria of focus, parameters for optimization, and operation groupings can be applied to the blended data set to reprocess and analyze the blended data set, automatically compute the selected performance attributes, and display results to the user. The result can be used to formulate and output drilling decisions for modifying or controlling the current wellbore drilling operation to improve the performance of the current wellbore drilling operation.

In block 318, a frontend UI can enable a user to interact with the dynamic blended data set. The frontend UI can be used to provide visual insight into data relationships in the blended dataset with performance attributes. The frontend UI may display customizable user inputs for dynamic well selection, data results, and customizable visuals of data. In some examples, the frontend UI may include one or more insight tools that can be integrated with the blended data set to process insights from the data.

In block 320, the operation of comparing data can be made available to an end user. For example, the frontend UI can include a mechanism for optionally comparing points of interest across well operations, both current and historical, for faster insight and decision-making purposes. In some examples, the user can create custom visuals from the blended data set as described in FIG. 4.

Figure 4:
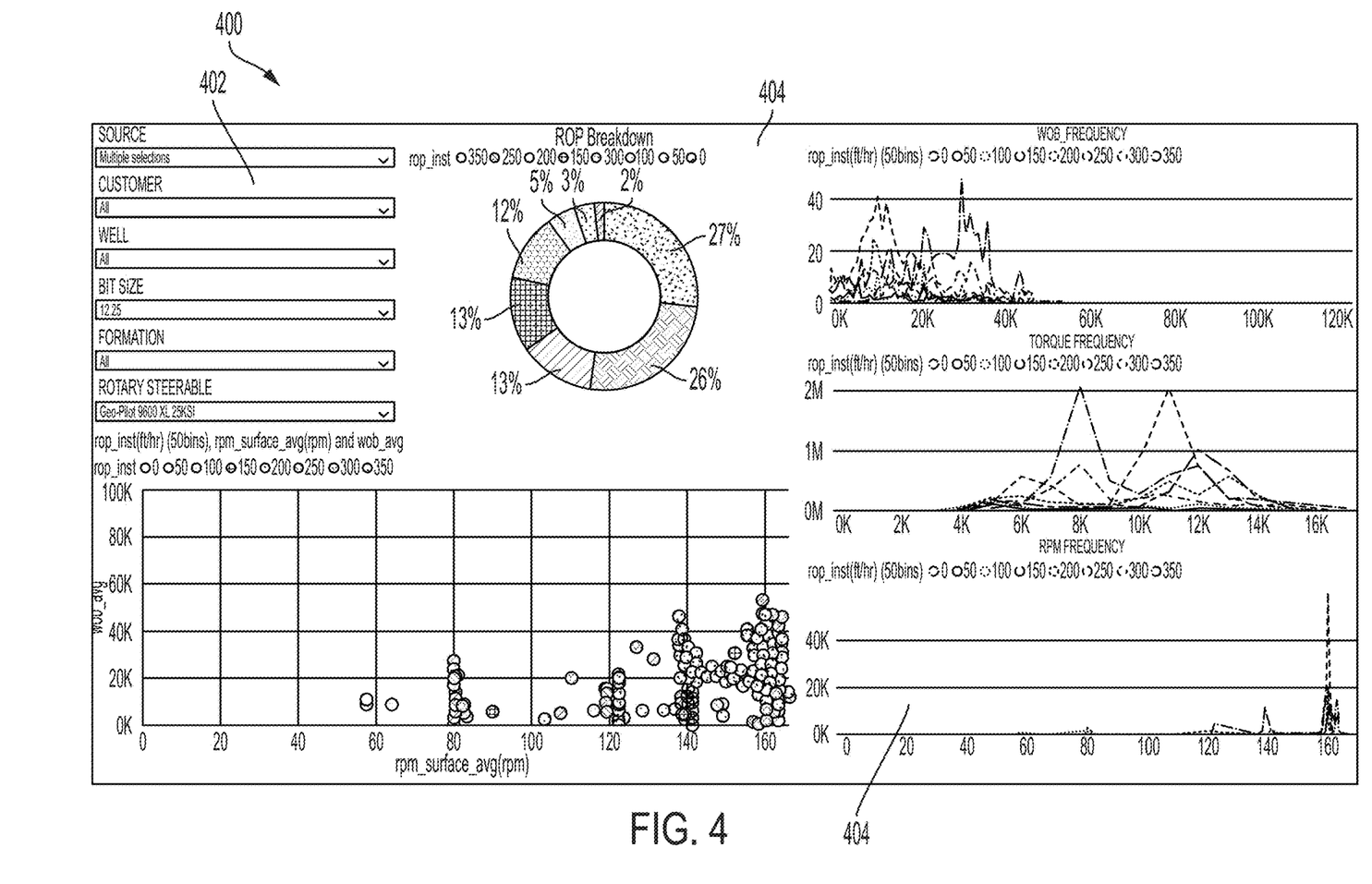
FIG. 4 is a user interface of an example of a custom visual of data that is integrated from multiple sources according to one example of the present disclosure.

FIG. 4 is a user interface of an example of a custom visual 400 of data that is integrated from multiple sources according to one example of the present disclosure. The diagram shows a custom visual 400 of the rate of penetration (ROP) breakdown of a drill bit (in feet/hour). The visual 400 can include multiple types of well criteria 402 and multiple types of graphs 404. The well criteria 402 can be selectable via multiple dropdown lists. A user may customize the well criteria 402 that are available to filter the data results. The user may select one or more values from the dropdown lists that filter the data results. Examples of well criteria 402 for filtering the results of ROP by well according to the present example include source, customer, well, formation, and rotary. The one or more graphs 404 can show the displayed data results for ROP breakdown. Examples of graphs 404 according to the present example include the number of ROP instruments by ROP (in feet/hour), revolutions per minute (RPM) surface average, weight on bit (WOB) average (in lbs.), WOB frequency by ROP, torque (in ft.-lbs.) frequency by ROP, and RPM frequency by ROP.

Visuals of data are not limited to the present example, and examples can appear in any other suitable configuration for displaying wellbore data. For example, data visuals can include user-friendly user interfaces, which may include text fields for user input. Data visuals may be displayed as a combination of one or more different types of color-coded graphs. In some examples, a data visual can be customized by an end user based on their needs. For example, data results of a wellbore operation from a blended data set can be available for customizing the well criteria that is available to filter the data results. Examples of data results for a wellbore operation from which a custom visual may be created can include any engineering data or log data for a wellbore operation. Any suitable well criteria (e.g. formation, well, source, activities, crew) can be selected from to further filter the data results. Any frontend configuration that is suitable for customizing results based on filtering available data may be used, and available filters on the data may vary depending on the choice of data results with which to customize the visual.

Figure 5:
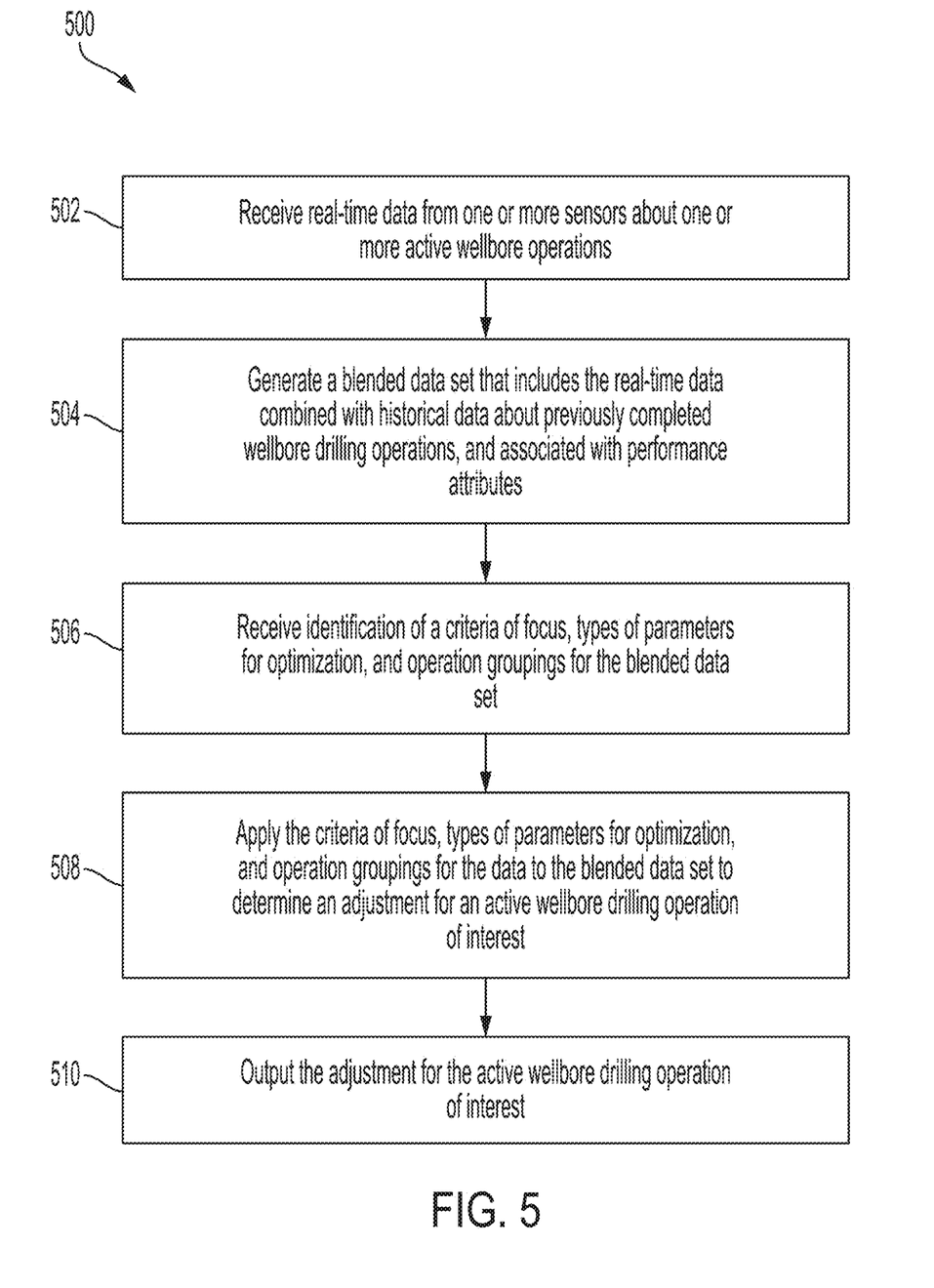
FIG. 5 is a flowchart of a process for generating a blended data set to determine an adjustment of a wellbore operation according to an example of the present disclosure.

FIG. 5 is a flowchart of a process 500 for generating a blended data set to determine an adjustment of a wellbore operation according to an example of the present disclosure.

At block 502, the computing device can receive real-time data from one or more sensors about one or more active wellbore operations. In some examples, incoming real-time data can be continuously integrated into an existing blended data set by being normalized asynchronously. In some examples, the incoming real-time data can be available to an end user for dynamically making selections from the real-time data. Dynamic selections can be the computing device continuously receiving new selections by an end user. In some examples, dynamic selections can include certain attributes from the incoming real-time data to be included in the blended data set or that indicate which real-time data sets are to be automatically reprocessed in the blended data set.

At block 504, the computing device can generate a blended data set that includes the real-time data combined with historical data about previously completed wellbore drilling operations and associated with performance attributes. In some examples, the performance attributes can be computed automatically with generating the blended data set. Examples of performance attributes can include duration of wellbore operation. In some examples, a subset of performance attributes can be selected by an end user of the system to optimize the selected attributes for a wellbore to be controlled in the current drilling operation.

At block 506, the computing device can receive identification of a criteria of focus, types of parameters for optimization, and operation groupings for the blended data set. For example, the criteria of focus, types of parameters for optimization, and operation groupings for the blended data set can be dynamically adjusted by an end user during the drilling operation via a dynamic well selector. The dynamic well selector can be a frontend user interface that includes user input fields with a selection of filters that can be applied to the blended data set. Filters can include the performance attributes, the criteria of focus, types of parameters for optimization, operation groupings, and available wells to which the system has access. In some examples, the dynamic well selector can include self-service tools calibrated with the frontend user interface, and the self-service selections by the end user can be applied to the blended data set.

At block 508, the computing device can apply the criteria of focus, types of parameters for optimization and operation groupings for the data to the blended data set to determine an adjustment for an active wellbore drilling operation of interest. For example, the data from the dynamic well selector can be applied to the blended data set to construct an optimized blended data set and compute selected performance attributes. In some examples, the optimized blended data set can compute the pre-defined performance attributes or the performance attributes associated with the user input.

At block 510, the computing device can output the adjustment for the active wellbore drilling operation of interest. The output can be determined from the data results of the blended data set. For example, the computing device can determine a number for which to shift the rotary of a drill bit for implementing the parameters of the optimized blended data set on the wellbore of interest. For example, the computing device may control automatically or output a drilling decision. In some examples, the computing device may automatically compute a change in drill speed or change in direction.

In some aspects, the system, method, and apparatus for are provided according to one or more of the following examples:

Example 1 is a method, comprising: receiving, by a computing device, real-time data from one or more sensors about one or more active wellbore operations; generating, by the computing device, a blended data set that includes the real-time data combined with historical data about previously completed wellbore drilling operations, and associated with performance attributes; receiving identification of a criteria of focus, types of parameters for optimization, and operation groupings for the blended data set; applying the criteria of focus, the types of parameters for optimization, and the operation groupings to the blended data set to determine an adjustment for an active wellbore drilling operation of interest; and outputting the adjustment for the active wellbore drilling operation of interest.

Example 2 is the method of Example 1, wherein generating the blended data set includes: normalizing, by the computing device, the real-time data to form normalized real-time data; normalizing, by the computing device, the historical data about previously completed wellbore drilling operations to form normalized historical data; combining the normalized real-time data and the normalized historical data; and determining the performance attributes and appending the blended data set with the performance attributes.

Example 3 is the method of Example 2, wherein normalizing the real-time data and the historical data includes determining one or more windows with which to apply a different index, by averaging a current index on each of a plurality of values in the window or performing a linear regression on the plurality of values.

Example 4 is the method of Example 2, wherein normalizing the real-time data and the historical data includes normalizing the real-time data to a format of the normalized historical data as the real-time data is received and stored.

Example 5 is the method of Example 1, wherein generating, by the computing device, the blended data set includes integrating new real-time data into a real-time database containing the real-time data about the one or more active wellbore operations concurrently with receiving the new real-time data during the one or more active wellbore operations.

Example 6 is the method of Example 1, wherein applying, by the computing device, the criteria of focus, the types of parameters for optimization, and the operation groupings to the blended data set includes automatically reprocessing the blended data set and automatically computing the performance attributes, wherein a dynamic well selector allows selection of a subset of the performance attributes, the criteria of focus, types of parameters for optimization, and operation groupings, and a subset of wells.

Example 7 is the method of Example 1, wherein applying, by the computing device, the criteria of focus, the types of parameters for optimization, and operation groupings for the data to the blended data set to determine the adjustment for the active wellbore drilling operation of interest includes: performing an analysis of the blended data set for determining the adjustment for the active wellbore drilling operation of interest; and outputting a result of the analysis of the blended data set for executing the adjustment.

Example 8 is the method of Example 1, further comprising creating a visual representation of data results from the blended data set for comparing the real-time data and the historical data in the blended data set.

Example 9 is a system comprising: a computing device; a memory device that includes instructions executable by the computing device for causing the computing device to: receive real-time data from one or more sensors about one or more active wellbore operations; generate a blended data set that includes the real-time data combined with historical data about previously completed wellbore drilling operations, and associated with performance attributes; receive identification of a criteria of focus, types of parameters for optimization, and operation groupings for the blended data set; apply the criteria of focus, the types of parameters for optimization, and the operation groupings to the blended data set to determine an adjustment for an active wellbore drilling operation of interest; and output the adjustment for the active wellbore drilling operation of interest.

Example 10 is the system of Example 9, wherein the memory device further includes instructions executable by the computing device for causing the computing device to generate the blended data set by: normalizing the real-time data to form normalized real-time data; normalizing the historical data about previously completed wellbore drilling operations to form normalized historical data; combining the normalized real-time data and the normalized historical data; and determining the performance attributes and appending the blended data set with the performance attributes.

Example 11 is the system of Example 10, wherein the memory device further includes instructions executable by the computing device for causing the computing device to normalize the real-time data and the historical data by determining one or more windows with which to apply a different index, by averaging a current index on each of a plurality of values in the window or performing a linear regression on the plurality of values.

Example 12 is the system of Example 10, wherein the memory device further includes instructions executable by the computing device for causing the computing device to normalize the real-time data and the historical data by normalizing the real-time data to a format of the normalized historical data as the real-time data is received and stored.

Example 13 is the system of Example 9, wherein the memory device further includes instructions executable by the computing device for causing the computing device to apply the criteria of focus, the types of parameters for optimization, and the operation groupings to the blended data set by automatically reprocessing the blended data set and automatically computing the performance attributes, wherein a dynamic well selector is configured to allow selection of a subset of the performance attributes, the criteria of focus, types of parameters for optimization, and operation groupings, and a subset of wells.

Example 14 is the system of Example 9, wherein the memory device further includes instructions executable by the computing device for causing the computing device to apply the criteria of focus, the types of parameters for optimization, and the operation groupings to the blended data set to determine the adjustment for the active wellbore drilling operation of interest by: performing an analysis of the blended data set for determining the adjustment for the active wellbore drilling operation of interest; and outputting a result of the analysis of the blended data set for executing the adjustment.

Example 15 is the system of Example 9, wherein the memory device further includes instructions executable by the computing device for causing the computing device to: create a visual representation of data results from the blended data set for comparing the real-time data and the historical data in the blended data set.

Example 16 is a non-transitory computer-readable medium comprising instructions that are executable by a processing device for causing the processing device to perform operations comprising: generating a blended data set that includes real-time data combined with historical data about previously completed wellbore drilling operations, and associated with performance attributes; receiving identification of a criteria of focus, types of parameters for optimization, and operation groupings for the blended data set; applying the criteria of focus, the types of parameters for optimization, and the operation groupings to the blended data set to determine an adjustment for an active wellbore drilling operation of interest; and outputting the adjustment for the active wellbore drilling operation of interest.

Example 17 is the non-transitory computer-readable medium of Example 16, wherein the operation of generating the blended data set includes: normalizing the real-time data to form normalized real-time data; normalizing the historical data about previously completed wellbore drilling operations to form normalized historical data; combining the normalized real-time data and the normalized historical data; and determining the performance attributes and appending the blended data set with the performance attributes.

Example 18 is the non-transitory computer-readable medium of Example 17, wherein the operation of normalizing the real-time data and the historical data includes determining one or more windows with which to apply a different index, by averaging a current index on each of a plurality of values in the window or performing a linear regression on the plurality of values.

Example 19 is the non-transitory computer-readable medium of Example 16, wherein the operation of applying the criteria of focus, the types of parameters for optimization, and the operation groupings to the blended data set includes automatically reprocessing the blended data set and automatically computing the performance attributes, wherein a dynamic well selector is configured to allow selection of a subset of the performance attributes, the criteria of focus, types of parameters for optimization, and operation groupings, and a subset of wells.

Example 20 is the non-transitory computer-readable medium of Example 16, wherein the operation of applying the criteria of focus, the types of parameters for optimization, and the operation groupings to the blended data set to determine the adjustment for the active wellbore drilling operation of interest includes: performing an analysis of the blended data set for determining the adjustment for the active wellbore drilling operation of interest; and outputting a result of the analysis of the blended data set for executing the adjustment.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A method, comprising:
   receiving, by a computing device, real-time data from one or more sensors about one or more active wellbore operations;
   generating, by the computing device, a blended data set that includes the real-time data combined with historical data about previously completed wellbore drilling operations, and associated with performance attributes;
   receiving identification of a criteria of focus, types of parameters for optimization, and operation groupings for the blended data set to dynamically filter at least a portion of the blended data set;
   applying the criteria of focus, the types of parameters for optimization, and the operation groupings to the blended data set to determine an adjustment of at least one physical parameter of a drilling tool of an active wellbore drilling operation of interest; and
   modifying the active wellbore drilling operation of interest by applying the adjustment of the at least one physical parameter to the drilling tool of the active wellbore drilling operation of interest.

2. The method of claim 1, wherein generating the blended data set includes:
   normalizing, by the computing device, the real-time data to form normalized real-time data;
   normalizing, by the computing device, the historical data about previously completed wellbore drilling operations to form normalized historical data;
   combining the normalized real-time data and the normalized historical data; and
   determining the performance attributes and appending the blended data set with the performance attributes.

3. The method of claim 2, wherein normalizing the real-time data and the historical data includes determining one or more windows with which to apply a different index, by averaging a current index on each of a plurality of values in the window or performing a linear regression on the plurality of values.

4. The method of claim 2, wherein normalizing the real-time data and the historical data includes normalizing the real-time data to a format of the normalized historical data as the real-time data is received and stored.

5. The method of claim 1, wherein generating, by the computing device, the blended data set includes integrating new real-time data into a real-time database containing the real-time data about the one or more active wellbore operations concurrently with receiving the new real-time data during the one or more active wellbore operations.

6. The method of claim 1, wherein applying, by the computing device, the criteria of focus, the types of parameters for optimization, and the operation groupings to the blended data set includes automatically reprocessing the blended data set and automatically computing the performance attributes, wherein a dynamic well selector allows selection of a subset of the performance attributes, the criteria of focus, types of parameters for optimization, and operation groupings, and a subset of wells.

7. The method of claim 1, wherein applying, by the computing device, the criteria of focus, the types of parameters for optimization, and operation groupings for the data to the blended data set to determine the adjustment for the active wellbore drilling operation of interest includes:
  performing an analysis of the blended data set for determining the adjustment for the active wellbore drilling operation of interest; and
  outputting a result of the analysis of the blended data set for executing the adjustment.

8. The method of claim 1, further comprising creating a visual representation of data results from the blended data set for comparing the real-time data and the historical data in the blended data set.

9. A system comprising:
  a computing device;
  a memory device that includes instructions executable by the computing device for causing the computing device to:
    receive real-time data from one or more sensors about one or more active wellbore operations;
    generate a blended data set that includes the real-time data combined with historical data about previously completed wellbore drilling operations, and associated with performance attributes;
    receive identification of a criteria of focus, types of parameters for optimization, and operation groupings for the blended data set to dynamically filter at least a portion of the blended data set;
    apply the criteria of focus, the types of parameters for optimization, and the operation groupings to the blended data set to determine an adjustment of at least one physical parameter of a drilling tool of an active wellbore drilling operation of interest; and
    modify the active wellbore drilling operation of interest by applying the adjustment of the at least one physical parameter to the drilling tool of the active wellbore drilling operation of interest.

10. The system of claim 9, wherein the memory device further includes instructions executable by the computing device for causing the computing device to generate the blended data set by:
  normalizing the real-time data to form normalized real-time data;
  normalizing the historical data about previously completed wellbore drilling operations to form normalized historical data;
  combining the normalized real-time data and the normalized historical data; and
  determining the performance attributes and appending the blended data set with the performance attributes.

11. The system of claim 10, wherein the memory device further includes instructions executable by the computing device for causing the computing device to normalize the real-time data and the historical data by determining one or more windows with which to apply a different index, by averaging a current index on each of a plurality of values in the window or performing a linear regression on the plurality of values.

12. The system of claim 10, wherein the memory device further includes instructions executable by the computing device for causing the computing device to normalize the real-time data and the historical data by normalizing the real-time data to a format of the normalized historical data as the real-time data is received and stored.

13. The system of claim 9, wherein the memory device further includes instructions executable by the computing device for causing the computing device to apply the criteria of focus, the types of parameters for optimization, and the operation groupings to the blended data set by automatically reprocessing the blended data set and automatically computing the performance attributes, wherein a dynamic well selector is configured to allow selection of a subset of the performance attributes, the criteria of focus, types of parameters for optimization, and operation groupings, and a subset of wells.

14. The system of claim 9, wherein the memory device further includes instructions executable by the computing device for causing the computing device to apply the criteria of focus, the types of parameters for optimization, and the operation groupings to the blended data set to determine the adjustment for the active wellbore drilling operation of interest by:
  performing an analysis of the blended data set for determining the adjustment for the active wellbore drilling operation of interest; and
  outputting a result of the analysis of the blended data set for executing the adjustment.

15. The system of claim 9, wherein the memory device further includes instructions executable by the computing device for causing the computing device to:
  create a visual representation of data results from the blended data set for comparing the real-time data and the historical data in the blended data set.

16. A non-transitory computer-readable medium comprising instructions that are executable by a processing device for causing the processing device to perform operations comprising:
  generating a blended data set that includes real-time data combined with historical data about previously completed wellbore drilling operations, and associated with performance attributes;
  receiving identification of a criteria of focus, types of parameters for optimization, and operation groupings for the blended data set to dynamically filter at least a portion of the blended data set;
  applying the criteria of focus, the types of parameters for optimization, and the operation groupings to the blended data set to determine an adjustment of at least one physical parameter of a drilling tool of an active wellbore drilling operation of interest; and modifying the active wellbore drilling operation of interest by applying the adjustment of the at least one physical parameter to the drilling tool of the active wellbore drilling operation of interest.

17. The non-transitory computer-readable medium of claim 16, wherein the operation of generating the blended data set includes:
normalizing the real-time data to form normalized real-time data;
normalizing the historical data about previously completed wellbore drilling operations to form normalized historical data;
combining the normalized real-time data and the normalized historical data; and
determining the performance attributes and appending the blended data set with the performance attributes.

18. The non-transitory computer-readable medium of claim 17, wherein the operation of normalizing the real-time data and the historical data includes determining one or more windows with which to apply a different index, by averaging a current index on each of a plurality of values in the window or performing a linear regression on the plurality of values.

19. The non-transitory computer-readable medium of claim 16, wherein the operation of applying the criteria of focus, the types of parameters for optimization, and the operation groupings to the blended data set includes automatically reprocessing the blended data set and automatically computing the performance attributes, wherein a dynamic well selector is configured to allow selection of a subset of the performance attributes, the criteria of focus, types of parameters for optimization, and operation groupings, and a subset of wells.

20. The non-transitory computer-readable medium of claim 16, wherein the operation of applying the criteria of focus, the types of parameters for optimization, and the operation groupings to the blended data set to determine the adjustment for the active wellbore drilling operation of interest includes:
performing an analysis of the blended data set for determining the adjustment for the active wellbore drilling operation of interest; and
outputting a result of the analysis of the blended data set for executing the adjustment.

* * * * *